US008640462B2

(12) United States Patent
Shnell

(10) Patent No.: US 8,640,462 B2
(45) Date of Patent: Feb. 4, 2014

(54) DEEP SEA GEOTHERMAL ENERGY SYSTEM

(76) Inventor: James H. Shnell, Santa Ana, CA (US)

( * ) Notice: Subject to any disclaimer, the term of this patent is extended or adjusted under 35 U.S.C. 154(b) by 1010 days.

(21) Appl. No.: 12/499,689

(22) Filed: Jul. 8, 2009

(65) Prior Publication Data

US 2010/0031652 A1 Feb. 11, 2010

Related U.S. Application Data

(60) Provisional application No. 61/084,218, filed on Jul. 28, 2008, provisional application No. 61/084,203, filed on Jul. 28, 2008, provisional application No. 61/150,239, filed on Feb. 5, 2009, provisional application No. 61/150,198, filed on Feb. 5, 2009.

(51) Int. Cl.
*F03G 4/00* (2006.01)

(52) U.S. Cl.
USPC .......................................................... 60/641.2

(58) Field of Classification Search
USPC ............................................. 60/641.1–641.7
See application file for complete search history.

(56) References Cited

U.S. PATENT DOCUMENTS

| | | | |
|---|---|---|---|
| 4,357,801 A | 11/1982 | Wahl | |
| 4,490,232 A * | 12/1984 | Lapeyre | 204/278 |
| 5,020,328 A * | 6/1991 | Bronicki | 60/641.5 |
| 6,138,774 A * | 10/2000 | Bourgoyne et al. | 175/7 |
| 6,668,554 B1 * | 12/2003 | Brown | 60/641.2 |
| 2006/0137349 A1 | 6/2006 | Pflanz | |
| 2007/0056770 A1 * | 3/2007 | Fraser | 175/14 |
| 2007/0119592 A1 | 5/2007 | McClung | |
| 2007/0223999 A1 * | 9/2007 | Curlett | 405/55 |
| 2007/0245729 A1 * | 10/2007 | Mickleson | 60/641.3 |
| 2009/0217664 A1 * | 9/2009 | Rapp et al. | 60/641.6 |
| 2009/0260358 A1 * | 10/2009 | Rapp et al. | 60/641.7 |
| 2010/0000214 A1 * | 1/2010 | Nagurny et al. | 60/641.2 |
| 2011/0138809 A1 * | 6/2011 | Ramaswamy et al. | 60/641.2 |

FOREIGN PATENT DOCUMENTS

CA 2211366 8/1996

OTHER PUBLICATIONS

Granovskii, Mikhail et al. "Thermodynamic Analysis of the Use of a Chemical Heat Pump to Link a Supercritical Water-Cooled Nuclear REactor and a Thermochemical Water-Splitting Cycle for Hydrogen Production." Journal of Power and Energy Systems. vol. 2 No. 2, Mar. 3, 2008. p. 756-767.*
Reiss et al., Utilization of Geothermal Energy from the Crystalline Basement, Nov. 1, 1990, pp. 443-448.
PCT, International Search Report for PCT/US2009/049952, Dec. 16, 2010.

(Continued)

*Primary Examiner* — Kenneth Bomberg
*Assistant Examiner* — Jonathan Matthias
(74) *Attorney, Agent, or Firm* — Knobbe, Martens, Olson & Bear LLP

(57) ABSTRACT

A geothermal energy system utilizes geothermal heat under the floor of a body of water. The system includes at least one well having a top and a bottom. At least one well is drilled to a sufficient depth to access geothermal heat from one or more areas under the floor. The system further includes at least one energy converter operatively coupled to the well. The at least one energy converter is configured to convert the geothermal heat to another form of energy.

28 Claims, 6 Drawing Sheets

(56) References Cited

OTHER PUBLICATIONS

"The Future of Geothermal Energy: Impact of Enhanced Geothermal Systems (EGS) on the United States in the 21$^{st}$ Century," © Massachusetts Institute of Technology, 2006, pp. 1-24.
A. Albertsson, J. Bjarnason, T. Gunnarsson, C. Ballzus and K. Ingason, "The Iceland Deep Drilling Project: Fluid Handling, Evaluation, and Utilization," in *International Geothermal Conference*, Reykjavik, Sep. 2003, at p. 28.
A. Kagel, *The State of Geothermal Technology, Part II: Surface Technology*, Geothermal Energy Association, 2008, "Mineral Recovery," pp. 49-52.
B.J. Skinner, "Hydrothermal Mineral Deposits: What We Do and Don't Know," in H.L. Barnes, ed., *Hydrothermal Ore Deposits*, 3rd edition.
Gudmundur, O. F., A. Albertsson, B. Stefansson, E. Gunnlaugsson, and H. Adalsteinsson, "*Deep Unconventional Geothermal Resources: a major opportunity to harness new sources of sustainable energy*," at cesenet.org/documents/p001099.doc.
http://www.smu.edu/geothermal/2004NAMap/2004Namap.htm.
J. Buongiorno, Idaho National Engineering and Environmental Laboratory,"The Supercritical-Water-Cooled Reactor," ANS, 2002 Winter Meeting, at http://gif.inel.gov/roadmap/pdfs/supercritcal-water-cooled_reactor.pdf.
J. Kozicz, "Transoceans Deepwater Frontier," at http://www.off-shore-mag.com/offshore/en-us/index/article-display.articles.offshore.volume-68.issue-4.drilling-technology-report.transoceanrsquos-deepwater-frontier.html.
J. L. Wise, T. Roberts, A. Schen, O. Matthews, W. A. Pritchard, G. Mensa-Wilmot, S. Ernst, R. Radtke, R. Riedel and J. Hanaway, "Hard-Rock Drilling Performance of Advanced Drag Bits," 28 Geothermal Resources Council Transactions, 2004 (pp. 177-184).
J. W. Smith, "Babcock & Wilcox Company Supercritical (Once Through) Boiler Technology," May 1998.
K. Bullis, "*Abundant Power from Universal Geothermal Energy*," MIT Technology Review, Aug. 1, 2006.
R. Gordon Bloomquist, Ph.D., "Economic Benefits of Mineral Extraction from Geothermal Brines," Washington State University Extension Energy Program, 2006, at http://bcsmain.com/mlists/files/megb/Papers//20Bloomquist.pdf.
Sigurvinsson, J., C. Mansilla, P. Lovera, and F. Werkoff, "*Can High Temperature Steam Electrolysis Function With Geothermal Heat?*" 32 International Journal of Hydrogen Energy, 2007 (pp. 1174-1182).
The National Renewable Energy Laboratory, "Geothermal Technology Program" at http://web.archive.org/web/20080112025516/http://www.nrel.gov/geothermal/geoelectricity.html.

* cited by examiner

DEEP SEA GEOTHERMAL ENERGY SYSTEM

CLAIM OF PRIORITY

This application claims the benefit of U.S. Provisional Patent Application Nos. 61/084,218 filed Jul. 28, 2008, and 61/084,203 filed Jul. 28, 2008, each of which is incorporated in its entirety by references herein, and U.S. Provisional Patent Application Nos. 61/150,239, filed Feb. 5, 2009, and 61/150,198, filed Feb. 5, 2009.

BACKGROUND

1. Field of the Invention

The present invention relates generally to a system and method for deep sea generation and/or storage of the products of water electrolysis and/or electric power.

2. Description of the Related Art

The current state of the art in geothermal production of electricity utilizes the heat in geothermal reservoirs of hot water or steam found under the surface of the land. However, the accessible geothermal resource base in the United States that is useable in current methods of generation is not sufficient to solve the current major issues in the electric generating industry such as global warming, pollution, or the costs and risks inherent in reliance on fossil fuels or in disposing of nuclear wastes.

Meeting tomorrow's needs by satisfying the increasing demand for electricity while enabling the retirement of less desirable modes of generating electricity such as the burning of coal or oil can require much more geothermal energy than is available using existing geothermal technology. Fortunately, the amount of geothermal heat available is far greater than the geothermal resource base that is accessible using current methods. Professor Jefferson Tester of the Massachusetts Institute of Technology has estimated that approximately 100 million quads of geothermal energy could be harvested per year. See, K. Bullis, "*Abundant Power from Universal Geothermal Energy*," MIT Technology Review, Aug. 1, 2006. The California Energy Commission has estimated that the geothermal heat contained in just the top six miles of the Earth's mantle represents 50,000 times as much energy as the combined reserves of oil and gas in the world.

Electricity produced from geothermal resources using current technology is almost cost competitive with energy produced from fossil fuels. (The average cost of electricity produced by binary geothermal plants is 5 cents to 8 cents per kilowatt/hour according to the National Renewable Energy Laboratory, "Geothermal Technology Program" at http://www.nrel.gov/geothermal/geoelectricity.html.) The current geothermal generating technology does not, however, operate at the temperatures or the efficiency of fossil-fueled plants.

As generating stations are developed and deployed, they are expected to gradually replace the fossil-fueled power plants that provide most of the electricity for the grid. It is, however, clear that petroleum and other current forms of transportation fuels will also have to be replaced in order to stop and reverse global warming. It is not yet clear whether it is electricity or hydrogen that will be the successor to such transportation fuels; in fact, both electricity and hydrogen may be so used at the same time, in different instances. In either event, electricity and hydrogen are means of storing and transporting energy, rather than sources of energy; the ultimate goal is to replace petroleum with geothermal energy as the source of energy for transportation. If electricity is the successor, then the demand for transportation energy can be met by the generating station, with base load electricity being put into bulk storage during off-peak hours. If the successor is hydrogen, the generating station operating in conjunction with electrolysers may meet the demand for fuel.

The current state of the art in the production of hydrogen uses chemical reactions to remove the hydrogen from hydrocarbons. This approach not only consumes some of the limited and increasingly expensive hydrocarbon fuels, it increases global warming. An alternative method of producing hydrogen uses electrolysis, but this method is too inefficient, and therefore too expensive, to be economically competitive. If, however, the generating stations produce direct current, as discussed below, they are expected to make alkaline electrolysers more efficient. Moreover, current research and development is progressing on high-temperature (or "steam") electrolysis, which is expected to become even more efficient. See Sigurvinsson, J., C. Mansilla, P. Lovera, and F. Werkoff, "*Can High Temperature Steam Electrolysis Function With Geothermal Heat?*" 32 International Journal of Hydrogen Energy, 2007 (pp. 1174-1182).

Currently, the energy industry is divided into the production of fuels for transportation and other purposes, and the production of electricity for the grid. The industry for transportation fuels is almost entirely separate in its operations from the electricity industry. The electricity industry is designed to be able to adjust production immediately to the grid's demand at any point in time, using some base load production and some "peaking" production, because storage of electricity is relatively expensive. Production of transportation fuels, however, is maintained at relatively constant levels, and substantial inventories of fuel are created and subsequently used as needed.

SUMMARY

In certain embodiments, a geothermal energy system utilizing geothermal heat under the floor of a body of water is provided. The system comprises at least one well having a top and a bottom. At least one well is drilled to a sufficient depth to access geothermal heat from one or more areas under the floor. The system further comprises at least one energy converter operatively coupled to the well. The at least one energy converter is configured to convert the geothermal heat to another form of energy.

In certain embodiments, a method provides energy. The method comprises providing at least one geothermal energy system utilizing geothermal heat under the floor of a body of water. The at least one system comprises at least one well having a top and a bottom, where said at least one well is drilled to a sufficient depth to access geothermal heat from one or more areas under the floor. The at least one system further comprises at least one energy converter operatively coupled to the well. The at least one energy converter is configured to convert the geothermal heat to another form of energy. The method further comprises operating the at least one system to provide electricity to an electrical power grid, to provide transportation energy, or both.

In certain embodiments, an apparatus for collecting solid materials from a fluid is provided. The apparatus comprises a conduit configured to allow the fluid to flow therethrough. The apparatus further comprises a mesh extending across the conduit. The mesh is configured to allow the fluid to flow therethrough and to allow a solid material to precipitate out of the fluid onto the mesh. The apparatus further comprises a support structure configured to support the mesh in position across the conduit.

DETAILED DESCRIPTION

Figure 1:
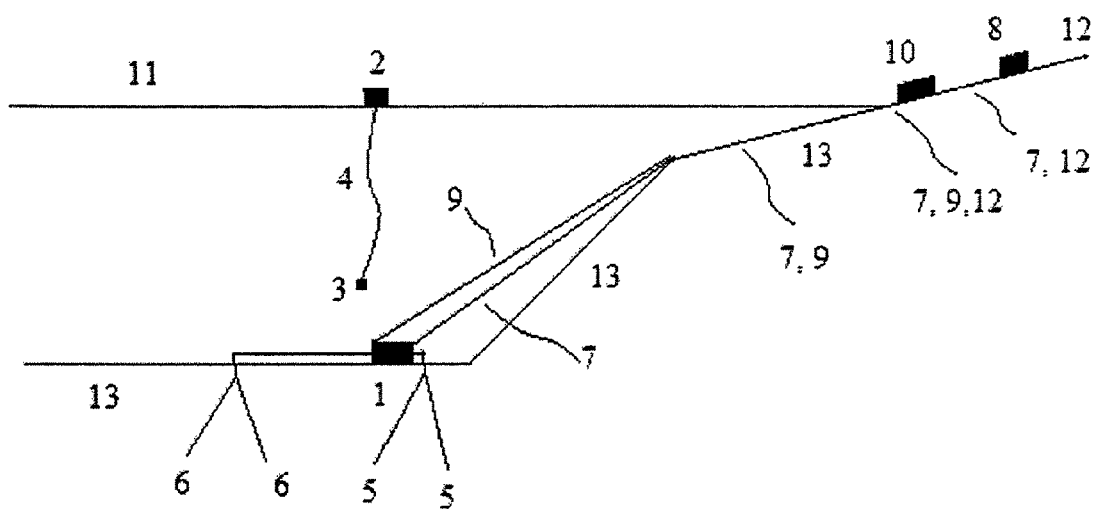
FIG. 1 is a cross-section schematic view of an example submersible geothermal generating station in accordance with certain embodiments described herein.

Certain embodiments described herein can advantageously be used to make efficient and effective use of a much larger part of the Earth's vast geothermal resources than is currently being used. Certain other embodiments described herein can advantageously be used to initially supply direct current to alkaline electrolysers. As the technology of high-temperature electrolysis matures, and steam electrolysis stations become more efficient, they can be located on the ocean floor to utilize geothermal heat, together with the excess off-peak electricity from generation stations, to produce hydrogen with steam electrolysers.

Certain embodiments described herein provide a system for the generation of electricity from geothermal energy that is able to provide enough base load electricity to replace coal, petroleum, natural gas and nuclear energy as primary sources of energy. The system of certain embodiments relies on access to geothermal energy in the ocean floors, where abundant geothermal resources can be found in a supercritical state to generate electricity for the grid and to provide energy for the transportation sector. Supercritical geothermal resources can be used for the generation of electricity on an efficient, economical basis through turbine-generators on the ocean floor to supply the grid's demand for electricity and, during off-peak hours, the power needed to replace existing transportation fuels. Such generation can form the foundation for restructuring the energy industry as a whole.

Certain embodiments described herein comprise one or more of the following components: (i) a self-contained, submersible, remote-controlled geothermal-powered electric generating station that can be placed on the deep seabed and can generate electric power from geothermal energy that is located under the seabed and that is accessed by geothermal wells drilled in the seabed; (ii) an electrolysis station using direct current from one or more generating stations; (iii) a self-contained, submersible, remote-controlled electrolysis station that can be placed on the deep seabed and can produce electricity and/or hydrogen and oxygen by high-temperature electrolysis using heat from geothermal energy that is located under the seabed and that is accessed by geothermal wells drilled in the seabed; (iv) the hydrogen (and, if desired, the oxygen) that is so produced in excess of current demand is stored in facilities on the ocean floor; (v) the electricity that is so produced is stored in facilities on the ocean floor; and (vi) the electric generating station is operated in conjunction with the electrolysis station and/or the station for bulk storage of electricity, which are also located on the seabed, with the operation of the stations being coordinated to generate electricity for the grid and provide transportation energy in place of existing fuels in a balanced mode for an energy industry that provides both electricity and transportation energy or fuels from a clean, base load resource that does not cause global warming.

Certain embodiments described herein access geothermal energy at a much higher temperature and pressure than current systems (e.g., above the critical point of water). The resulting increase in the power of certain embodiments is further enhanced by the greater efficiency of the types of generating stations and electrolysis stations that can be used with such supercritical fluid. These improvements can enable geothermal energy to compete with coal-fired plants and petroleum-based fuels on the basis of cost. They can also access a much larger volume of geothermal resources than can be accessed by current technologies.

Geothermal resources at supercritical temperatures and pressures are accessible under the deep seabed, which enables the use of much more efficient and economical systems than current systems, as well as the exploitation of a much more extensive resource than is currently used. One purpose of certain embodiments described herein is to provide clean energy at a cost competitive with fossil-fueled systems by enabling the use of the vast amount of geothermal energy that is present below the seabed beyond the continental shelf.

Some of the benefits provided by certain embodiments described herein include:

Virtually unlimited supply of energy
Cost competitive with fossil fuels
Base load generation
Use of technologies that have already been demonstrated in other fields
No global warming
No pollution
No other environmental impact (e.g., bird mortality)
No other surface impact (e.g., visual)
Not affected by weather, calendar or clock
Transmission to major load centers is easy to permit
No waste of the limited water resources on land
Unlimited cooling capacity
More sustainable geothermal reservoir Certain embodiments described herein provide direct current electricity from the generating stations, which can be used to power electrolysis more efficiently than alternating current. Certain embodiments access geothermal energy at a very high temperature and pressure, and thus increase the efficiency and the ability of electrolysis to compete with current methods of producing hydrogen. It also accesses a much larger volume of geothermal resources than can be accessed by current technologies. Certain embodiments described herein include a new and advantageous approach to the bulk storage of electricity and/or a new and advantageous approach to the storage of large inventories of hydrogen, and certain other embodiments utilize a new and advantageous approach to the overall energy industry.

As hydrogen and oxygen are produced at the bottom of the ocean, certain embodiments described herein keep the gases in separated volumes and store them advantageously in underwater tank or cavern facilities. The storage facilities are far from shore, thus assuring the safety of people and property on shore in the event of any substantial leaks from the storage facilities. The storage of hydrogen is also remote from the storage of oxygen, so that simultaneous leaks of both gases are less likely and, even if both gases leak at the same time, they are less likely to mix and present a hazard of combustion. The storage facilities are built at a depth such that the pressure of the ocean at that depth equals the pressure at which it is desired to store the gases, in order to maximize storage at minimal volume without having to make the walls of the tanks capable of withstanding large pressure differentials. This high pressure can have two potential uses, beyond optimizing the volume of storage. If the hydrogen (and perhaps the oxygen) is to be used as transportation fuel, the pressure enhances the transmission of the gases to the point where they are dispensed, and it helps to compress the gases into the fuel tanks of the vehicles. In the alternative, the gases may be used in gas turbine or other "peaker plants" to generate electricity when peak demand requires it, in which case the pressure in the storage facilities can reduce or eliminate the need for compression in the turbine and can thereby enhance the efficiency of the peaker plants. This storage method can also benefit from the cold temperatures at such ocean depths, which can enable the storage of a larger amount of gas at a given pressure and volume.

Certain embodiments utilize the linking and balancing of the foregoing innovations with each other. Currently, the industry for transportation fuels is almost entirely separate in its operations from the electricity industry. In certain embodiments that facilitate replacing current transportation fuels by the ocean-floor generation of geothermal electricity, the result can be an electricity industry that is predominantly characterized by base load, geothermal electricity. Variations in demand for electricity can in certain embodiments be balanced by the use of excess off-peak, base load (and therefore inexpensive) electricity to produce inventories of energy for transportation (whether by the storage of electricity or by the production of hydrogen, or both) rather than balancing base load power with the use of more-expensive and less-efficient "peaking" power. To the extent that current forms of transportation fuels are replaced by electricity, bulk storage of electricity on the ocean floor can facilitate the use of base load geothermal electricity. To the extent that current forms of fuels are replaced by hydrogen, storage of hydrogen can also facilitate the use of base load geothermal electricity. To the extent that other forms of electrical generation, such as wind or solar, are used in the generating mix, they can be designed and run optimally, and balanced by the use of base load geothermal power and the grid-balancing production of inventories of transportation energy described above.

The fundamental energy problem addressed by certain embodiments described herein is the need to develop an abundant new source of power to generate electricity cleanly. Geothermal heat is clean, and virtually unlimited, but the amount that can be harnessed economically using current technology is limited.

One approach to providing more geothermal power is to reach deeper into the Earth's crust for heat, because geothermal temperatures increase with depth. Increased depth of drilling, however, increases the difficulty of drilling and the cost per meter of drilling. The difficulty and cost have prevented the use of deeper wells to provide more energy. The land areas where geothermal heat rises close enough to the surface to be economically accessible are limited, and very few of those resources exceed a temperature of 250° C. An instructive exception is Iceland, which has great geothermal resources because it is located on the mid-ocean rift zone of the Atlantic Ocean. As a result, Iceland has comparatively easy access to large, high-quality geothermal resources. It is estimated that beneath three of the developed geothermal fields in Iceland, temperatures should exceed 550° C. to 650° C., and the occurrence of frequent seismic activity below 5 km, indicates that the rocks are brittle and therefore likely to be permeable. See, Gudmundur, O. F., A. Albertsson, B. Stefansson, E. Gunnlaugsson, and H. Adalsteinsson, "*Deep Unconventional Geothermal Resources: a major opportunity to harness new sources of sustainable energy*," at cesenet.org/documents/p001099.doc. A consortium of national governments and energy companies is seeking to use these exceptional resources by drilling to a depth of approximately 5,000 meters in order to tap supercritical geothermal resources. The engineers working on this Iceland Deep Drilling Project have calculated that supercritical geothermal resources could provide up to ten times as much power, per unit of volume, as the geothermal resources used in the current technology. ("A conventional well that produces dry steam only, at a wellhead pressure of 25 $bar_a$ and a downhole pressure of 30 $bar_a$ can yield approximately 5 MW of electric power if the volumetric rate of inflow to the well is 0.67 $m^3s^{-1}$. An IDDP well tapping a supercritical reservoir with temperatures of 430-550° C. and pressures of 230-260 bar may be expected to yield 50 MW of electric power given the same volumetric inflow rate, 0.67 $m^3s^{-1}$. An IDDP well may thus afford a tenfold improvement in power output over a typical conventional well." A. Albertsson, J. Bjarnason, T. Gunnarsson, C. Ballzus and K. Ingason, "The Iceland Deep Drilling Project: Fluid Handling, Evaluation, and Utilization," in *International Geothermal Conference Reykjavik*, September 2003, at page 28.) A more recent study indicated that a liter of supercritical water at a temperature of 400° C. and a pressure of 250 bar "has more than five times the power producing potential than a hydrothermal liquid water geofluid at 225° C." ("The Future of Geothermal Energy: Impact of Enhanced Geothermal Systems (EGS) on the United States in the $21^{st}$ Century,"© Massachusetts Institute of Technology, 2006, pp. 1-24.) Even so, the expense of drilling the well has been estimated to be substantial, and it is not certain that the resource, although supercritical in the reservoir, 5,000 meters below the surface, can still be supercritical when it reaches the surface.

The geothermal resources accessible in Iceland are unique, however, because it is situated in a mid-oceanic rift zone. In other areas, it is necessary to drill much deeper to access such temperatures. The difficulty and cost of drilling through a large amount of rock can, however, be avoided by drilling offshore. According to the USGS, the Earth's crust in continental landmasses averages approximately 30,000 meters in thickness, and can be as thick as 100,000 meters, but the thickness of the Earth's crust under the oceans averages about 5,000 meters and is less in some areas. (In the continental land masses, not only is the upper surface of the crust higher, but the lower surface of the crust is correspondingly deeper.) The geothermal resources under vast areas of the seabed off the West Coast of the United States achieve temperature ranges of more than 400° C.

The U.S. Geological Survey recently estimated that the accessible geothermal resource base in California that is useful for conventional methods of generation is sufficient to support only 5,000 megawatts. However, only 1,700 megawatts of that geothermal resource base that is not already developed can be developed economically. Fortunately, the amount of geothermal heat available is far greater than the USGS estimate of the accessible geothermal resource base. In fact, the California Energy Commission has determined that, worldwide, the geothermal heat contained in just the top six miles of the Earth's mantle represents 50,000 times as much energy as the combined reserves of oil and gas in the world. The question is not where to find the clean energy that is needed. The geothermal resources in the ocean floor are vast enough to supply all of the world's future energy requirements. The question is how to access those resources.

The West Coast of the United States, for example, has excellent geothermal resources that lie close to the shore. Features that have been recently discovered demonstrate these resources most clearly. The Juan de Fuca tectonic plate is a (comparatively) small tectonic plate that forms the ocean floor along the coast of Northern California and the Pacific Northwest. Over the past twenty years, a number of "black smokers" have been discovered on the plate approximately 100 miles from shore. (A "black smoker" is a submarine geothermal vent that spews hot water, generally at a temperature of approximately 400° C., into the ocean. Black smokers are found at an average depth of approximately 2,100 meters below sea level.) The Juan de Fuca plate also has a "spreading zone," where the sea floor splits and magma rises to form new crust, along the Gorda Rise and the Juan de Fuca Rise, which parallel the coast of Northern California, Oregon and Washington approximately 150 miles from shore. A volcano on the Gorda Rise has been active on at least two occasions in recent years. South of the Juan de Fuca plate, five seamounts, the Gumdrop, Pioneer, Guide, Davidson and Rodriguez seamounts, lie along the coast of California, approximately 150 miles off shore.

These features, however, are simply indicators of the available resource under the ocean floor. A more graphic and fully documented indication of the resource was published in 2004. The Geothermal Map of North America, a small image of which can be viewed at http://www.smu.edu/geothermal/2004NAMap/2004Namap.htm, shows the surface heat flows in many of the most favorable areas of the Western United States, such as the Geysers and the Salton Sea, in shades of orange and medium red. Most of the area of the ocean floor off the coast of the Western United States, however, is shown in shades ranging from red to bright pink, indicating that huge areas adjacent to the coast are significantly more productive of heat than the most productive areas on land. However, in certain embodiments described herein, the generating station would not be limited to use off the West Coast of the United States. Although the West Coast has unusually favorable characteristics, many areas of the ocean floor lying off the continental shelf in other parts of the world can also be favorable. Moreover, mid-oceanic rift zones, like the one in which Iceland is located, run through the middle of the Pacific and Atlantic Oceans, and across the floor of the Indian Ocean. At one geothermal vent near the Mid-Atlantic Ridge, the fluids were found recently to reach a temperature of 464° C. Certain embodiments described herein can be adapted to produce electricity for much of the world. It is expected that generating stations can initially be deployed and developed in areas that are close to shore, and particularly well-suited to their use (such as the ocean floor next to the West coast of North America and other areas in the so-called "Ring of Fire") just as the oil industry began in shallow oil fields such as those in Pennsylvania. However, as the technology is further refined and advanced, development of ever-greater areas of the ocean floor can be economically viable. It is expected that, ultimately, the world can develop the greater heat resources and reservoirs that border the mid-oceanic rift zones. The objective will be to discover and develop zones having temperatures of 550° C. or more and to tap reservoirs of geothermal fluid at such temperatures, or to create such reservoirs using enhanced geothermal system technologies.

The technology of offshore drilling to the depths contemplated by this proposal has already been developed in drilling for the oil and gas industry. The largest oil field in the Gulf of Mexico is approximately 150 miles from shore. Recently, oil companies have drilled wells with bottoms as much as 8,000 meters below sea level, and have drilled wells in water as deep as 2,800 meters. Drilling for geothermal resources can, however, present two additional challenges not usually faced in offshore drilling. The rock to be drilled is igneous, rather than sedimentary, and it is harder. Also, the temperature of the rock is significantly higher. Both of these challenges have been met, however. Iceland has been drilling geothermal wells in igneous rock for some time, and Sandia National Laboratory has been working with several companies to develop drill bits that can be more effective than current bits in drilling hard rock. (J. L. Wise, T. Roberts, A. Schen, O. Matthews, W. A. Pritchard, G. Mensa-Wilmot, S. Ernst, R. Radtke, R. Riedel and J. Hanaway, "Hard-Rock Drilling Performance of Advanced Drag Bits," 28 Geothermal Resources Council Transactions, 2004 (pp. 177-184).) In addition, progress is being made in the use of seawater as a drilling fluid. Because seawater is so used at a faster rate than ordinary drilling mud is used, the seawater's more rapid flow can cool the rock more in the spot being drilled, easing the drilling. Moreover, drilling with seawater is less expensive than drilling with mud. Other advancements in the technology of well drilling, such as managed pressure drilling (see, J. Kozicz, "Transoceans Deepwater Frontier," at http://www.offshore-mag.com/offshore/en-us/index/article-display.articles.offshore.volume-68.issue-4.drilling-technology-report.transoceanrsquosdeepwater-frontier.html), are advancing more rapidly in the current art of offshore geothermal wells.

A significant advantage to drilling offshore as in certain embodiments described herein is the much higher temperatures at which the geothermal resource can be accessed. Most of the geothermal reservoirs under development in the West provide heat at a temperature of 250° C. or less. Based on a number of submarine geothermal discoveries, offshore wells can access geothermal resources at temperatures above 400° C. The higher temperature provides a disproportionately large advantage in efficiency (see discussion below). Another major advantage of certain embodiments described herein is that reservoirs can be more sustainable, because the heat flow through the rock is much higher, as reflected in the Geothermal Map described above. (If the temperature of the mantle at the base of the ocean crust is 700° C., which is the average temperature at the top of the Earth's mantle, and the crust is 5,000 meters thick, then the temperature of the crust under the ocean increases with depth at a rate of 140° C. per 1,000 meters, which is four times the average rate of increase in the temperature of the crust in the continents.) Also, unlike land-based wells, there is a virtually unlimited supply of water with which to create or enlarge geothermal reservoirs, if enhanced geothermal systems are necessary, or to help to recharge existing reservoirs, the presence of which is indicated by black smokers.

Drilling geothermal wells in deep water off the coast can provide the additional advantage of simplifying the permitting process for such wells, since the wells can be far removed from any population, so they cannot affect the populace, and can be outside of the jurisdiction of local governments. In addition, because the electric transmission lines can be laid on the seabed and brought directly on shore at ports and other coastal load centers, obtaining permits for the transmission of the electricity can be easier than for land-based facilities, which must transit suburbs and other inhabited areas. The transmission lines may be brought to shore in major coastal communities, providing power in the midst of a load center and avoiding the need to create new or additional transmission lines over land to deliver the power from remote generating locations. Thus, certain embodiments described herein can expand renewable distributed generation technologies to help provide electricity in high-demand, high-congestion areas.

Where an offshore well is used to reach the geothermal energy under the ocean floor, a new approach can be needed to generate electricity. The current approach, on land, brings steam or hot water to the surface and converts the heat so transported to electricity. In these geothermal wells, some of the energy is lost in transit. As the well is drilled deeper, a higher proportion of the energy is lost in transit. Even more heat would be lost by bringing the resource to the surface of the ocean through a pipe surrounded and cooled, for two thousand meters or more of its length, by ocean water.

Certain embodiments described herein provide a self-contained, submersible, remote-controlled, geothermal-powered electric generating station that comprises one or more turbines coupled to one or more generators for converting geothermal energy to electricity. FIG. 1 is a cross-sectional schematic view of an example geothermal energy generation station in accordance with certain embodiments described herein. The station 1 can, for example, be built on a barge, which can be towed by a ship or tug 2 to the ocean surface 11 above one or more geothermal wells, then submerged and lowered by winches on the tug to the site on the ocean floor 13 prepared to receive the station. When one or more production wells 5 have been successfully completed, the drill ship can also drill several shallow holes adjacent to the wellhead(s), into which pilings can be cemented to support and anchor the station in a position such that the intake for the station can connect directly to the production wellhead(s). There, by remote control, with the assistance (to the extent needed) of a remotely operable submersible vehicle 3 operated from the tug 2 using a ship-to-vehicle cable 4, the station is coupled to the wellhead(s) for one or more geothermal production wells 5 and to pipes connected to the wellhead(s) for one or more injection wells 6 to inject the cooled geothermal fluid back into the reservoir under the ocean floor. The injection well may be the initial well drilled for a generating station, which can then be used to inject seawater to create, expand and/or pressurize the geothermal reservoir, which can also provide data to enhance the ability of the drill ship to determine the optimal locations to which to drill the planned production well(s). In addition, because the generating station will be located near and connected to an electric transmission line, that line can be used as a source of electric power to assist, as needed, in the placement, connection, and start-up of the generating station.

Certain embodiments described herein can be designed to use the production from more than one well, each of which is started in close proximity to the others but accesses different geothermal reservoirs, or different areas of the same reservoir, by directional drilling. The use of more than one well can enable the use of a larger turbine, and larger turbines are more efficient than small turbines.

In certain embodiments, the station is operatively coupled to a remote control cable 7 that enables control of the station from a facility 8 on land 12. In certain embodiments, the station is operatively coupled to an undersea transmission cable 9 that delivers the electricity to the electrical grid substation 10 on land 12. Such remote control can be facilitated by the development and use within the station of application-specific integrated circuits and other devices to automate simple and repetitive tasks in the installation and operation of the station. The station can be detachable from the wellheads and the cables by remote control, again with the assistance (to the extent needed) of a remotely operable submersible vehicle 3 operated from the tug 2, so that it can be retrieved by a tug every one to two years for maintenance and overhaul.

In certain embodiments, the station is in a standardized version, so that an identical station can immediately replace a station that is retrieved. The station is designed with enough buoyancy to permit the station to be lifted to the ocean surface with relatively little work. A submersible remotely operable vehicle 3, operated from a ship or tug 2 on the ocean surface, handles minor repairs and adjustments that may be necessary between overhauls, to the extent that they can't be handled with the remote controls built into the station. Placing the station on the ocean floor, at a depth of 2,000 meters or more, conserves the pressure that would otherwise be expended to move the supercritical resource to sea level, and avoids the loss of temperature (and consequent loss of efficiency) that would result from being more remote from the wellhead.

In certain embodiments, supercritical water is used, which provides approximately five times as much power per liter as the geothermal fluids used in current binary geothermal systems. An additional advantage of certain embodiments is that turbines that are powered by supercritical water are 20% more efficient than steam turbines. (J. Buongiorno, Idaho National Engineering and Environmental Laboratory, "The Supercritical-Water-Cooled Reactor," ANS, 2002 Winter Meeting, at http://gif.inel.gov/roadmap/pdfs/supercritcal-water-cooled_reactor.pdf.) Moreover, the greater amount of energy provided by the supercritical resource permits certain embodiments described herein to use a larger turbine than conventional geothermal systems, and larger turbines tend to be more efficient than smaller turbines. Additional efficiency can be gained due to the use of the surrounding ocean water for cooling, which is generally at a temperature of approximately 3° C. and, therefore, is an excellent and virtually unlimited source of cooling water. Accordingly, certain embodiments described herein can produce up to 6 times as much power per well as the current approach produces. Supercritical turbines are also simpler and smaller, and less expensive to build, and they are highly reliable, able to operate for two years between shutdowns for scheduled maintenance. (Ibid; J. W. Smith, "Babcock & Wilcox Company Supercritical (Once Through) Boiler Technology," May, 1998.) In fact, the pressure of the ocean outside of the turbine, at 200 atmospheres or more, enables the turbine of certain embodiments to operate with much thinner walls than would be the case on land, thus saving some of the cost and increasing the efficiency of the turbine. In addition, supercritical seawater is less dense than seawater that is not supercritical (approximately one-third as dense under the conditions anticipated for the geothermal reservoir) so the supercritical brine from the reservoir will rise more quickly and easily in the production wells and, after losing most of its heat in the heat exchanger, it will become approximately three times more dense, so that the station can use three production wells and still will use only one injection well, and will not expend as much energy to pump the brine back down the injection well because the greater density of the cooled brine will assist in its return to the reservoir. All of these factors are significant advantages in creating a submersible generating station. Note that certain embodiments may use a single-stage turbine in order to reduce cost and simplify the system for design, construction and maintenance, or certain embodiments may use more than one stage, and achieve an even higher efficiency. For example, a first turbine can comprise a condenser utilizing a coolant, and a second turbine can receive the coolant, permit the coolant to expand, and to provide additional power. Advantageously, a fluid with a lower heat of vaporization and lower boiling point than water can be used as the coolant for the first turbine, so that the larger amount of heat absorbed from condensing the water (which has a high heat of vaporization) can be used to vaporize a larger volume of coolant, and the coolant (as the working fluid of the second turbine) can take advantage of the large difference in temperature between the water being condensed in the first turbine and the seawater outside the second turbine which (at 3° C.) can be used to chill the second fluid.

In certain embodiments, the geothermal generating station produces direct current electricity, rather than the alternating current electricity that is most commonly produced by current generators. Direct current can provide several advantages in certain embodiments, including the following: (a) there is no need to synchronize the generating station to the grid when starting up and operating the station; (b) the transmission of direct current underwater is easier and more efficient (particularly over long distances) than the transmission of alternating current underwater; and (c) direct current is more efficient than alternating current for performing electrolysis.

Figure 2:
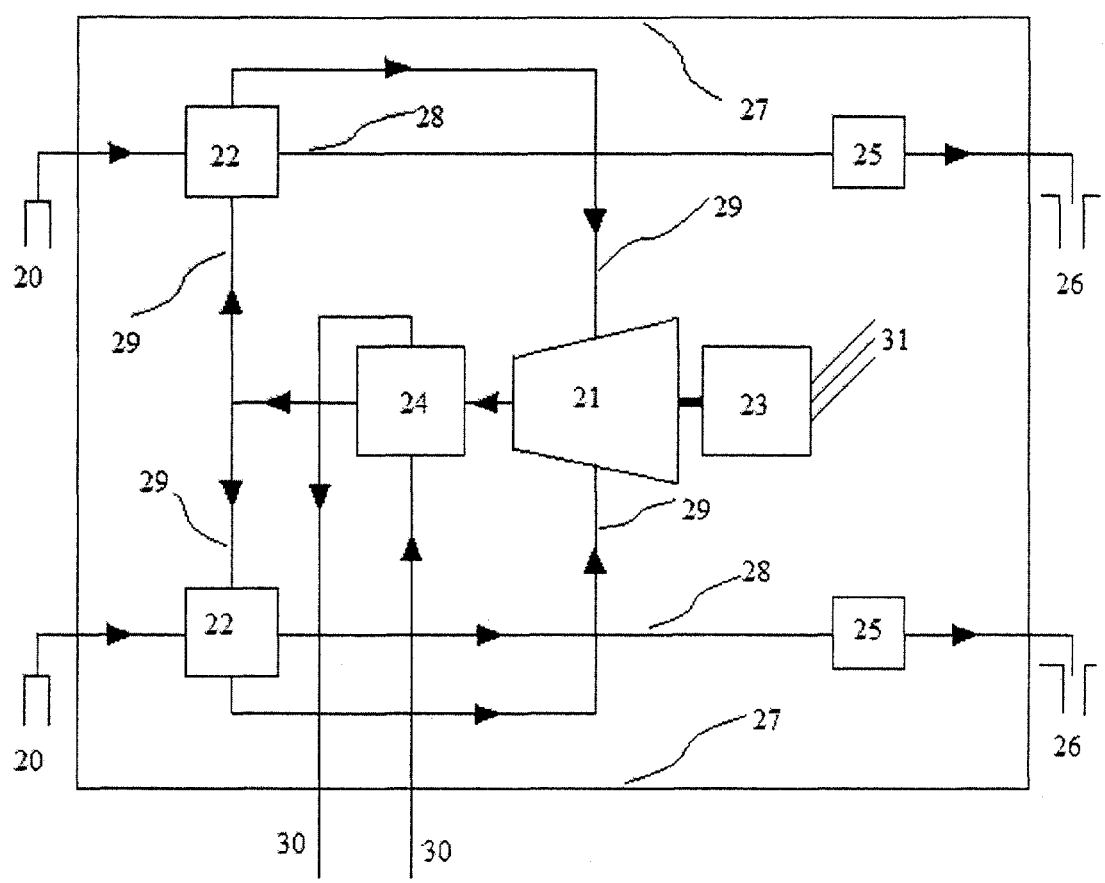
FIG. 2 is a schematic block diagram of an example submersible geothermal generating station in accordance with certain embodiments described herein.

In certain embodiments, the geothermal generating station is a binary system. FIG. 2 is a schematic view of an example station and the geothermal wells in accordance with certain embodiments described herein. This approach pipes the geothermal brine 28 from the production wellhead(s) 20 outside the station boundary 27 to heat exchanger(s) 22 that keep the supercritical turbine 21 separate from the minerals in the resource, which would otherwise build up in the turbine. The heated turbine feedwater 29 flows from the heat exchanger 22 to the turbine 21, which drives the generator 23 to produce electricity which is then carried by transmission lines to the electric grid 31. The exhaust from the turbine 21 passes into the condenser 24, where it is cooled by the flow of cooling water 30. The cooled geothermal brine from the heat exchanger 22 flows to injection pump(s) 25, which pump the cooled brine outside the station boundary 27 to the injection well(s) 26. The build-up of minerals can be cleaned from the heat exchanger 22 using customary geothermal techniques, more easily than they can be cleaned from the turbine. Accordingly, the ability to deal with scaling is very important. When a heat exchanger 22 is used, the turbine 21 then operates like a standard supercritical turbine without the complications of scaling. Standardized turbines, rather than turbines that have been designed for the conditions of a specific well, are less expensive to build and maintain, and can allow the turbines to be replaced by an equivalent turbine when maintenance is necessary. The heat exchanger is more efficient than normal heat exchangers because the supercritical pressure of the geothermal resource fluid is approximately equivalent to the supercritical pressure of the fluid used in the turbine, so the walls of the heat exchanger do not need to be made of very thick (and therefore inefficient) and/or very expensive materials to contain the pressures. In another embodiment, the station dispenses with the heat exchanger and uses the geothermal resource directly in the supercritical turbine, further increasing efficiency.

In certain embodiments, as an alternative to customary techniques of cleaning the heat exchanger, using a binary system advantageously enables the removal of metal and mineral deposits to be dealt with outside of the turbine, and the metals and minerals will provide an additional source of revenue. For one thing, the geothermal fluid will have originated as seawater, and is therefore likely to have started with a relatively high salinity. For another thing, supercritical water has special properties and therefore will dissolve from the rock many metals and minerals more readily than heated water would under subcritical conditions. The effect of these factors may vary significantly from one reservoir to another.

Certain embodiments for collecting metals and minerals comprise determining which metals and minerals are present in the geothermal fluid, and the conditions under which they will precipitate out or scale most readily. In certain embodiments, an apparatus is used to collect solid materials from the geothermal fluid. The heat exchanger of certain embodiments has, at appropriate locations, one or more mechanisms to draw one or more meshes from one or more spools and across the flow of geothermal fluid and onto one or more take-up spools in such a manner that the fluid will flow through the mesh(es). Each such mesh will be made of materials (and may convey an electrical current) such that specific, desired metals and/or minerals will bind to that mesh under the temperature, pressure and other conditions (which may include the injection into the brine of a precipitant at or just before such mesh) prevailing in that location in the heat exchanger. For examples of conventional geothermal approaches that have been commercially unsuccessful, see R. Gordon Bloomquist, Ph.D., "Economic Benefits of Mineral Extraction from Geothermal Brines," Washington State University Extension Energy Program, 2006, at http://bcsmain.com/mlists/files/megb/Papers//20Bloomquist.pdf (discussing extraction of silica, which facilitates subsequent extraction of lithium, zinc, manganese and other elements); A. Kagel, *The State of Geothermal Technology Part II: Surface Technology*, Geothermal Energy Association, 2008, "Mineral Recovery," pp 49-52 (discussing various studies and attempts at mineral and metal recovery from geothermal brine); and B. J. Skinner, "Hydrothermal Mineral Deposits: What We Do and Don't Know," in H. L. Barnes, ed., *Hydrothermal Ore Deposits*, 3rd edition (stating that precipitation of metals and minerals from hydrothermal fluids results from at least four factors: change in temperature, change in pressure, chemical reactions between the fluid and the surrounding lining, and mixing of the fluid with another solution). The spool of mesh will unwind on one side of the flow of geothermal fluid and, as the mesh becomes saturated with metals and minerals from the fluid, it will be taken up by a spool on the other side of the flow of geothermal fluid. Each such mesh will thereby remove particular metals and minerals from the location of such mesh, before they scale up on the heat exchanger, and such mesh will thereby selectively pick up, and thereby concentrate, such particular metals and minerals, depending on the qualities of the mesh and its location in the heat exchanger, so that the metals and minerals will to a large extent be separated from each other, which will make it easier and cheaper to reclaim and refine them for use in industry, thus creating an additional source of revenue. The length of each mesh and the size of the spools are designed so that, at the speed at which such mesh is drawn across the current, there will be enough mesh to last from one scheduled maintenance of the station to the next, at which time the spools and the mesh will be replaced. In certain embodiments, the apparatus for collecting solid materials can be land-based and can use geothermal fluid from a land-based location.

In certain embodiments, the loss of power that would otherwise be caused by raising the resource to the surface can be minimized, since the well in the ocean floor utilizes less drilling to reach supercritical temperatures. The shorter well not only saves power, but also drilling costs. It also decreases the material cost of the well, since less pipe, cement, and other materials can be required. The shorter well also makes it easier to maintain the water at supercritical temperatures and pressures. Although some aspects of certain embodiments described herein are likely to be more expensive (at least initially) than the similar aspects of current geothermal systems (such as well maintenance, for example), the much higher value of the geothermal resource that is accessed by such embodiments and the lower cost and higher efficiency of the turbine of certain embodiments can more than compensate for such higher expenses, and thereby bring down the overall cost of the power generated, making it cost competitive with power generated by coal-fired plants. Even if the overall costs of certain such embodiments are higher than the overall costs of an existing system, the cost per megawatt produced by the station is lower than the cost per megawatt of the existing system when the station's power output is higher than that of the existing system by an even greater ratio.

Certain embodiments described herein can also help to resolve another problem with current geothermal technology because current geothermal wellhead equipment is not designed to handle the pressure created by a temperature of 400° C. to 600° C. Wellhead blowouts would be a problem for supercritical production wells on land, but the much higher ambient pressures underwater (approximately 200 atmospheres at a depth of 2 kilometers) make it easier to contain the pressures in the well. In fact, ocean pressures at that depth are approximately the same as the pressure of supercritical water, so the pressures inside and outside the station would be about the same.

Geothermal generating stations can gradually replace the fossil-fueled power plants that currently provide most of the electricity for the grid. In addition, petroleum and other current forms of transportation fuels can also be replaced in order to stop and reverse global warming. It is not yet clear whether it is electricity or hydrogen that will be the successor to such transportation fuels; in fact, both electricity and hydrogen may be so used at the same time, in different instances. If the successor is hydrogen, the generating station of certain embodiments described herein operating in conjunction with electrolysers may meet the demand for fuel.

The existing methods of production of hydrogen by electrolysis are inefficient. If, however, the generating stations of certain embodiments described herein produce direct current, they can make alkaline electrolysers more efficient. Certain embodiments can initially supply direct current to alkaline electrolysers. As the technology of high-temperature electrolysis matures, future steam electrolysis stations in accordance with certain embodiments described herein can be located on the ocean floor to use geothermal heat, together with the excess off-peak electricity from generation stations, to produce hydrogen. Where an offshore well is used to reach the geothermal energy under the ocean floor, certain embodiments provide a self-contained, submersible, remote-controlled station located on the ocean floor to use high-temperature electrolysis, which in turn uses high-temperature geothermal resources under the ocean floor to supply the necessary heat. Geothermal resources at just 230° C. can be economically competitive with alkaline electrolytic processes, and ocean-floor geothermal temperatures are substantially higher than 230° C. The increasing efficiency of high-temperature electrolysis is driven by higher temperature, so the higher geothermal temperatures in the ocean floor can increase efficiency. Also, if the temperature of the geothermal resource is not high enough to achieve optimal efficiency, heat pumps (driven, in turn, by more geothermal energy) may be used to increase the temperature from the resource. Since the efficiency of this form of production of hydrogen is also increased by pressure, the high pressures at such ocean depths can increase the cost-effectiveness of this form of electrolysis. In addition, certain embodiments can also use geothermal heat to desalinate seawater for use in electrolysis, thus providing hydrogen without consuming any of the limited resources of fresh water on land. The station's heat pumps can also be used when the demand for electricity on land is high, because the amount of electricity required for electrolysis decreases as the temperature increases. Therefore, at times of high demand for electricity on the grid (peak demand), some of the geothermal heat is diverted to the heat pumps to increase the temperature and thereby decrease the amount of electricity used in the electrolysis. At non-peak times, when more electricity is available, the geothermal heat that is diverted to heat pumps during on-peak hours is used directly in electrolysis, thus increasing the production of hydrogen. If demand for electricity is so high that no electricity is then available for electrolysis, the hot water can be stored in an insulated chamber in the station, and the heat pumps can be used to raise the temperature of the water even higher, in order to store the energy. Geothermal heat, which the wells of certain embodiments provide on a continual basis, is therefore used continuously, but in ways that can be varied as required.

Figure 3:
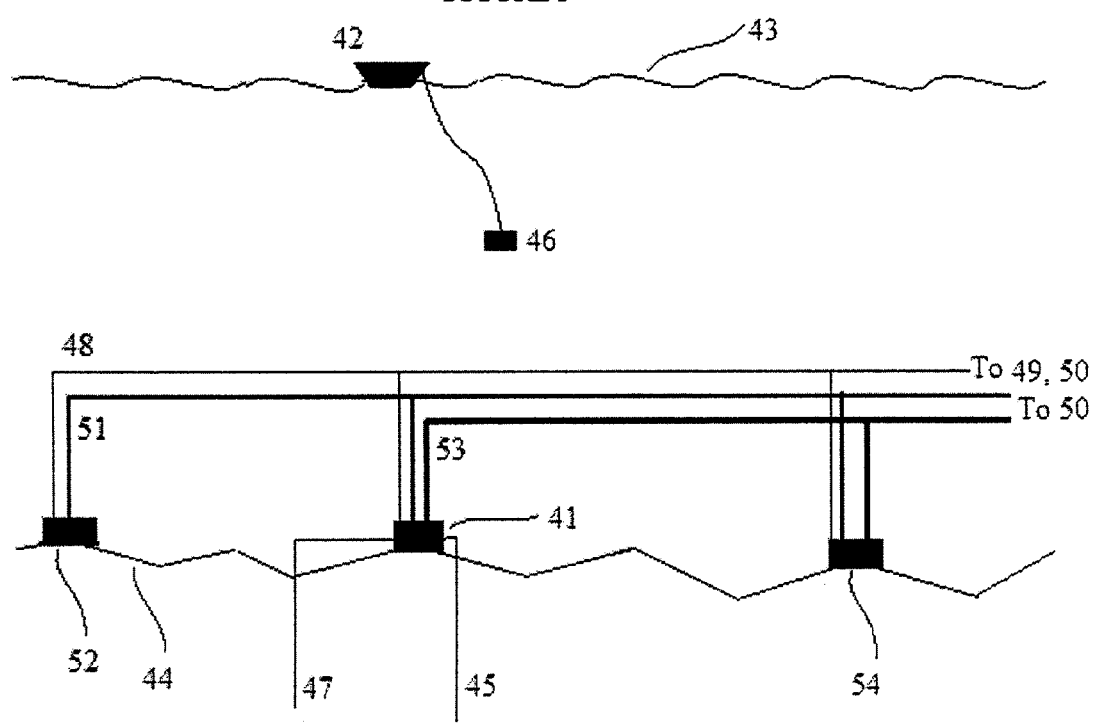
FIG. 3 is a cross-section schematic view of an example submersible geothermal electrolysis station in accordance with certain embodiments described herein.

Certain embodiments can be constructed on shore and transported to their sites. FIG. 3 is a cross-sectional schematic view of an example station in accordance with certain embodiments described herein. The station 41 can, for example, be built on a barge, which is towed by a ship 42 to the ocean surface 43 above one or more geothermal wells, then submerged and lowered by winches on the ship 42 to the site on the ocean floor 44 prepared for the station. When a production well 45 has been successfully completed, the drill ship can also drill several shallow holes adjacent to the wellhead, into which pilings can be cemented to support and anchor the station in a position such that the intake for the station can connect directly to the production wellhead. There, by remote control, with the assistance (to the extent needed) of a remotely operable submersible vehicle 46 operated from the ship 42, the station 41 of certain embodiments is coupled to the wellhead(s) for one or more geothermal production wells 45 and to pipes connected to the wellhead(s) for one or more injection wells 47 to inject the cooled geothermal fluid back into the reservoir.

Certain embodiments can be designed to use the production from more than one well, each of which is started in close proximity to the others but accesses different geothermal reservoirs, or different areas of the same reservoir, by directional drilling. The station of certain embodiments is also connected: to a remote control cable 48 that enables the remote control of the station 41 from a facility 49 on land 50; to an undersea transmission cable 51 that delivers to the facility 49 the electricity used in the process from a generator 52 either on the ocean floor 44 or on land 50; and to pipelines 53 to carry the hydrogen and oxygen produced to storage 54 or to land 50. The station 41 of certain embodiments is detachable from the wellheads, the cables and the pipelines by remote control, again with the assistance (to the extent needed) of a remotely operable submersible vehicle 46 operated from the ship 42, so that the station 41 can be retrieved by a ship 42 as necessary for maintenance and overhaul. Existing versions of electrolysis units can undergo maintenance every six months; this frequency of maintenance can be met more easily if, as discussed below, the electrolysis stations are placed near the shore. In the alternative, if the stations are placed farther from shore, such maintenance can be provided from the ship loading platforms, also discussed below, to which the stations are connected in order to load the hydrogen and oxygen on tankers for transport to shore. In certain embodiments, the station 41 is in a standardized version, so that an identical station can immediately replace a station that is retrieved. The station 41 can be designed with enough buoyancy to permit the station 41 to be lifted to the surface with relatively little work. A submersible remotely operable vehicle 46, operated from a ship 42 on the ocean surface 43, handles minor repairs and adjustments that may be necessary between overhauls, to the extent that they can't be handled with the remote controls built into the station 41. Placing the station 41 on the ocean floor in certain embodiments avoids the loss of temperature (and consequent loss of efficiency) that would result from being more remote from the production wellhead. In FIG. 3, transmission pipelines, transmission cables, and remote control cables are shown, for purposes of clarity, as though they are floating but, in reality, these features are laid on, and anchored to, the ocean floor.

Figure 4:
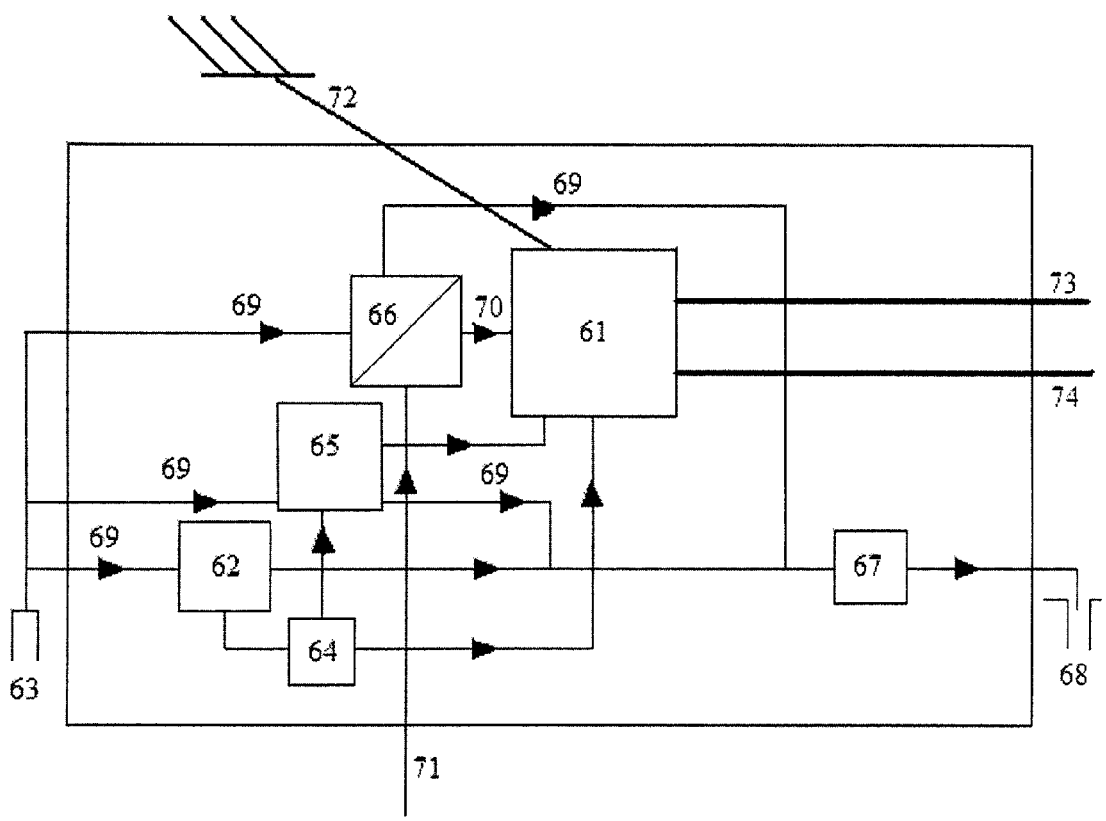
FIG. 4 is a schematic block diagram of an example submersible geothermal electrolysis station in accordance with certain embodiments described herein.

Certain embodiments described herein provide a binary system. FIG. 4 is a schematic view of an example station and the geothermal wells in accordance with certain embodiments described herein. This approach pipes the geothermal brine flow 69 from the production wellhead 63 to a desalinization facility 66, which purifies seawater 31 into the feedwater 70 for the electrolysis process 61, and also pipes the geothermal brine flow 69 to a heat exchanger 62, which separates the electrolysis process 61 from the minerals and metals in the resource, which would otherwise build up in the electrolysis process 61. The build-up of metals and minerals can be cleaned from the heat exchanger 62 using customary geothermal techniques, more easily than they can be cleaned from the electrolysis process 61, and the electrolysis process 61 then operates like a standard electrolysis process 61. Standardized electrolysis processes, rather than electrolysis processes that have been designed for the conditions of a specific well, are less expensive to build and maintain, and allow an electrolysis process 61 to be replaced by a second, equivalent electrolysis process 61 when maintenance is necessary. An electric transmission line 72 provides the electricity that the electrolysis process 61 uses to split the feed water into hydrogen, which is transported from the facility by a hydrogen gas pipeline 73, and oxygen, which is transported from the facility by an oxygen gas pipeline 74. The cooled geothermal brine that is rejected from the desalinization facility 26 and from the heat exchanger 22 is collected by the injection pump 67 and pumped to the injection well 68. The heat exchanger 62 of certain embodiments is more efficient than normal heat exchangers because the supercritical pressure of the geothermal resource fluid is approximately equivalent to the supercritical pressure of the water used in the electrolysis process 61, so the walls of the heat exchanger 62 do not need to be made of very thick (and therefore inefficient) and/or very expensive materials to contain the pressures. Increasing efficiency of high-temperature electrolysis is driven, in part, by higher temperature and, if the temperature of the geothermal resource is not high enough to achieve optimal efficiency, a control valve 64 diverts some or all of the geothermal resource to a heat pump 65 (driven, in turn, by more geothermal energy) which is used to increase the temperature from the resource. In addition, some embodiments also use geothermal heat to desalinate seawater 71 for use in the electrolysis, while other embodiments use the pressure of the seawater and reverse osmosis or micro filtration to desalinate seawater 71. The station's heat pumps 65 can also be used when the demand for electricity on land is high, because the amount of electricity required for electrolysis decreases as the temperature increases. Therefore, for certain embodiments, at times of high demand for electricity on the grid (peak demand), some of the geothermal heat is diverted by the control valve 64 to the heat pump 65 to increase the temperature and thereby decrease the amount of electricity used in the electrolysis. At non-peak times, when more electricity is available, the geothermal heat that is diverted to heat pumps during on-peak hours is used directly in electrolysis, thus increasing the production of hydrogen. Furthermore, in certain embodiments, the station can be operated using electricity from land-based sources in appropriate circumstances.

Just as transportation fuels are currently stored in inventory, if hydrogen and oxygen are produced, they can also be stored in inventory. If the hydrogen and oxygen are produced on the ocean floor, storing them in facilities on the ocean floor presents several advantages. As hydrogen and oxygen are produced underwater, they can be separated and stored in underwater tank farms or caverns in accordance with certain embodiments described herein. The tank farms or caverns can be far from shore, for safety purposes, and separated from each other. They can be built at such a depth that the pressure of the ocean water equals the pressure at which the gases are to be stored, in order to maximize storage at minimal volume without having to make the walls of the tanks capable of withstanding large pressure differentials. This pressure has two potential uses. It enhances the transmission of the gases for use as transportation fuels and for compressing into the fuel tanks of cars. In the alternative, if the gases are used in gas turbine "peaker plants" to generate electricity when peak demand requires it, the pressure enhances the efficiency of the peaker plants. This storage method also benefits from the cold temperatures at such depths, which enables the storage of a larger amount of gas at a given pressure and volume. In fact, the storage of gases can be managed by advantageously using the cooling capacity of the cold ocean water when compressing the gases for storage, and advantageously using geothermal heat to increase the pressure of the gases when seeking to transmit the gases.

Figure 5:
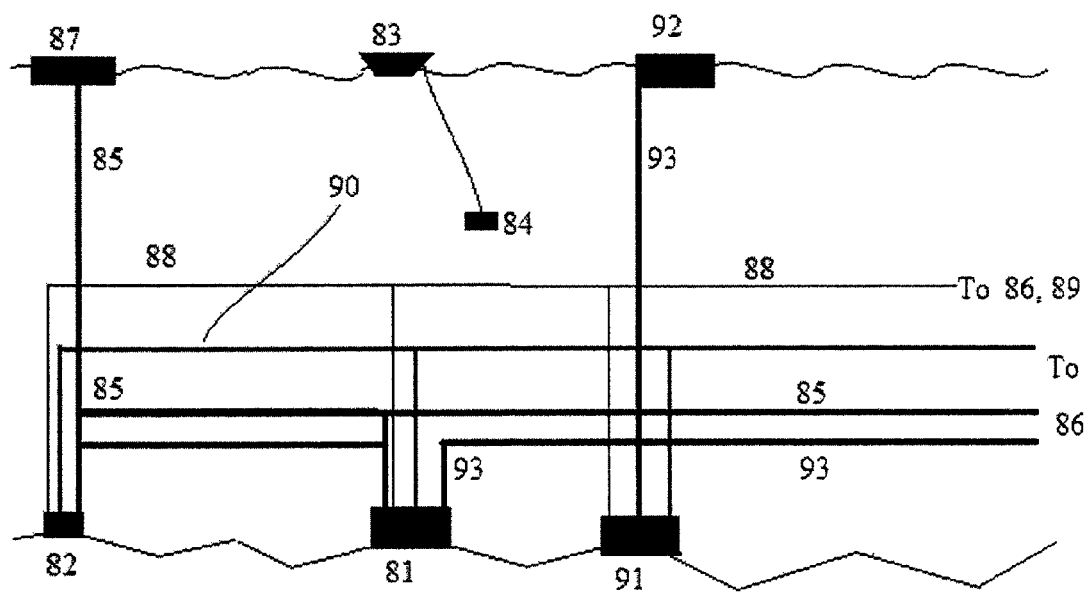
FIG. 5 is a cross-section schematic view of another example submersible geothermal electrolysis station, using storage facilities in accordance with certain embodiments described herein.

Certain embodiments can include a storage facility located on the ocean floor to store hydrogen or oxygen. FIG. 5 is a cross-sectional schematic view of an example facility in accordance with certain embodiments described herein. The facility comprises an electrolysis station 81 and one or more oxygen storage tanks 82 and one or more hydrogen storage tanks 91 that can be constructed on shore in certain embodiments and transported to the desired site (which is selected on the basis, among other factors, of ocean depth and therefore water pressure) by ship 83. In certain other embodiments, the oxygen tanks 82 and/or the hydrogen tanks 91 can be assembled aboard ship 83 at the desired site, and in either case lowered from the ship 83 onto the desired site and anchored to the ocean floor at the desired site. Each oxygen tank 82 or hydrogen tank 91 may, for example, comprise a flexible bladder housed inside a protective shell. The shell of certain embodiments can admit ocean water, but exclude foreign objects, so that the bladder is protected from foreign objects, but is constantly subject to the water pressure at such depth and maintains pressure inside it equal to the ocean's pressure outside it. There, by remote control, with the assistance (to the extent needed) of a remotely operable submersible vehicle 84 operated from the ship 83, the electrolysis station 81 of certain embodiments is connected to oxygen transmission pipelines 85 and hydrogen transmission pipelines 93 from the electrolysis station 81 to oxygen storage tanks 82 and hydrogen storage tanks 91, and for delivery of the gas to land 86 or to tanker loading platforms for oxygen 87 and for hydrogen 92, for transport of the gas by tankers to available ports. Certain embodiments can be designed to use the production from more than one electrolysis station 81. The facility can also be connected to a remote control cable 88 that enables the remote control of the facility from a control room 89 and to electrical transmission lines 90 to provide the electricity that may occasionally be used to operate the facility. A submersible, remotely operable vehicle 84 operated from a ship 83 handles minor repairs and adjustments that may be necessary from time to time, to the extent that they can't be handled with the remote controls built into the facility. The facility of certain embodiments can deliver the gas through oxygen pipelines 85 and hydrogen pipelines 93 that run to shore, or through oxygen pipelines 85 and hydrogen pipelines 93 that connect to ship loading platforms or areas for oxygen 88 of for hydrogen 93, as appropriate, for transport of the gas by tanker ship to available ports. In FIG. 5, transmission pipelines, transmission cables, and remote control cables are shown, for purposes of clarity, as though they are floating but, in reality, these features are laid on, and anchored to, the ocean floor.

Certain other embodiments include a storage facility located on the ocean floor to store energy in bulk. The current state of the art in bulk storage of energy (e.g., electricity) is to use the electricity to compress a gas, such as air, and to store the gas in its compressed state until the energy is needed, at which time the energy is converted from pressure back into electricity. The bulk storage facility of certain embodiments comprises one or more tanks on the ocean floor (or other storage space, such as caverns in the ocean floor), connected by gas transmission lines to one or more compressors (e.g., using a flexible bladder as described above with regard to the storage of hydrogen and/or oxygen). The storage tanks (or other space) of certain embodiments are at a depth such that the pressure of the ocean at that depth equals the pressure at which it is desired to store the gases, in order to maximize storage at minimal volume without having to make the walls of the tanks capable of withstanding large pressure differentials. The storage tanks (or other space) of certain embodiments can be located in or on the ocean floor to permit the creation of a virtually unlimited volume of storage, with little or no difficulty in siting or permitting the facilities. When energy (e.g., electricity) is to be stored in certain embodiments, the compressor is operated and compressed gas (e.g., air) is stored in the tanks or caverns and, when the electricity is needed, the process is reversed and the compressed gas is used to generate additional electricity. As is the case with the storage of hydrogen and oxygen, the storage of air or other compressed gas can be managed by advantageously using the cooling capacity of the cold ocean water when compressing the gases for storage, and advantageously using geothermal heat to increase the pressure of the gases when seeking to transmit the gases.

Certain embodiments comprise one or more generating stations using geothermal energy from the ocean floor to produce electricity, enabling a fundamental change in the structure of the energy industry. Currently, the industry for transportation fuels is almost entirely separate in its operations from the electricity industry. The electricity industry is designed to be able to adjust production immediately to the demand at any point in time, using some base load production and some "peaking" production, because storage of electricity is relatively expensive. Production of transportation fuels, however, is maintained at relatively constant levels, and substantial inventories of fuel are created and subsequently used as needed. In accordance with certain embodiments described herein, the generation of electricity on the ocean floor using geothermal energy can result in an electricity industry that is predominantly characterized by base load, geothermal electricity. Variations in demand for electricity can be balanced by a high level of base load electricity and the use of excess off-peak, base load (and therefore inexpensive) electricity to produce inventories of energy for transportation, rather than balancing a lower level of base load power with the use of more-expensive and less-efficient "peaking" power. In the United States, the ratio of peak demand for electricity to average demand for electricity on the grid is such that, if base load generating capacity sufficient to satisfy peak electrical demand is built and operated at capacity throughout the year, the off peak energy generated would be approximately equal to the amount of energy used annually for transportation, thus providing all the transportation energy as well as the electricity used by the grid at relatively inexpensive, base load cost. To the extent that other forms of electrical generation, such as wind or solar, are used in the generating mix, they can be designed and run efficiently, and balanced by the use of base load geothermal power and the grid-balancing production and storage of transportation energy.

Figure 6:
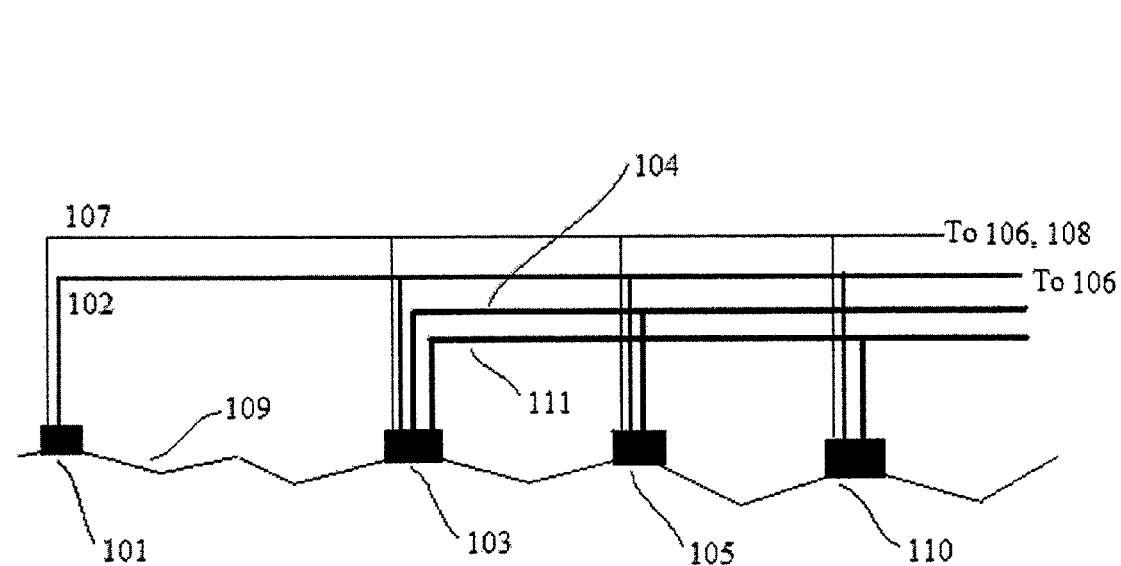
FIG. 6 is a cross-section schematic view of another example submersible geothermal electrolysis station using electricity generated from ocean-floor geothermal energy in accordance with certain embodiments described herein.

Certain such embodiments comprise one or more generating stations using geothermal energy from the ocean floor to produce electricity. FIG. 6 is a cross-sectional schematic view of an example of a plurality of one or more electrical generating stations 101, one or more electrolysis stations 103, one or more hydrogen storage facilities 105 and one or more oxygen storage facilities 110 on the ocean floor 109 in accordance with certain embodiments described herein. Each such generating station 101 is linked by electric transmission lines 102 to the electric grid on land and to one or more electrolysis stations 103 as described herein. Each such electrolysis station 103 in certain embodiments is linked by hydrogen transmission lines 104 to one or more hydrogen storage facilities 105 and by oxygen transmission lines 111 to one or more oxygen storage facilities 110 and may also be so linked directly to gas storage and transmission facilities on the land 106. Each such hydrogen storage facility 105 and oxygen storage facility 110 in certain embodiments is linked by hydrogen transmission lines 104 and oxygen transmission lines 111 directly to gas storage and transmission facilities on the land 106. Each such generating station 101, electrolysis station 103 hydrogen storage facility 105 and oxygen storage facility 110 in certain embodiments is linked by a control cable 107 to a control room 108 on land 106, so that they are operated remotely, in a coordinated and balanced mode to provide electricity to the grid on demand and transportation energy for demand or for inventory, as appropriate.

Certain such embodiments, making coordinated use of generating stations 101 and electrolysis stations 103, can result in the placement of many generating stations 101 in oceanic rift zones around the world. The ocean floor in rift zones is not as deep as other areas of the ocean floor but is still deep enough in many areas to provide supercritical water pressures. In certain embodiments, the generating stations 101 can be designed to generate direct current, which can be transmitted to the continental coastlines by high-voltage direct current ("HVDC") transmission lines, similar to the proposed transmission line from Iceland to Great Britain. Such lines can transmit power efficiently over distances of 2,000 kilometers or more. The electrolysis stations 103 of certain embodiments can be placed near the coasts, in the subduction trenches that are created where the ocean floor dives beneath the continental edges, and the gases can be brought to shore by transmission lines. The floors of such trenches are often at great depths, which can provide very high pressures (which will enable the system to save energy that would otherwise be needed for the compression of the hydrogen that is produced, or potentially to enable the use of reverse osmosis or micro filtration to produce pure water for electrolysis, and thereby increase overall efficiency) while the depth of the trenches can also provide greater proximity to geothermal resources, which can be used to increase the efficiency of the electrolysis. In certain other embodiments, the electrolysis stations 103 can be placed near the rift zones, and the gases can be brought to shore by tanker ships. The HVDC transmission lines from generating stations can provide direct current to inverters, near the coast, for conversion of the power into alternating current to supply the grid on shore as needed to meet demand, with excess power being delivered as direct current to storage or to the electrolysis stations 103, where the direct current will be more efficient than alternating current in the production of hydrogen. As discussed above, existing versions of electrolysis units can undergo maintenance every six months; this frequency of maintenance can be met more easily if the electrolysis stations are placed near the shore or, if the stations are placed farther from shore, e.g. near rift zones, such maintenance can be provided from the ship loading platforms, also discussed above. In FIG. 6, transmission pipelines, transmission cables, and remote control cables are shown, for purposes of clarity, as though they are floating but, in reality, these features are laid on, and anchored to, the ocean floor.

Thus, certain embodiments, as described above, can provide clean energy for the electric grid and for transportation, at a cost competitive with fossil-fueled systems, using the vast amount of geothermal energy below the seabed.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A geothermal energy system utilizing geothermal heat under a floor of a body of water, the system comprising:
    at least one production well drilled to a sufficient depth to access supercritical water from a first region of a reservoir under a floor of a body of water;
    at least one injection well configured to inject water into a second region of the reservoir spaced from the first region; and
    at least one geothermal energy generator at a depth of at least 2000 meters within the body of water and operatively coupled to the at least one production well and the at least one injection well, the at least one geothermal energy generator configured to receive the supercritical water from the at least one production well, to convert geothermal heat from the supercritical water to another form of energy, and to pump water into the at least one injection well.

2. The system of claim 1, wherein the at least one geothermal energy generator is adapted to be operated by remote control.

3. The system of claim 1, wherein the at least one geothermal energy generator has a standardized form to facilitate maintenance of the at least one energy generator.

4. The system of claim 1, further comprising at least one heat exchanger configured to receive the supercritical water from the at least one production well.

5. The system of claim 4, wherein the at least one heat exchanger is configured to collect minerals and metals from the supercritical water.

6. The system of claim 1, wherein the at least one geothermal energy generator comprises one or more turbines and one or more generators of electrical energy.

7. The system of claim 6, wherein the one or more turbines are configured to use a supercritical operating fluid, wherein the system is configured to heat the supercritical operating fluid using the supercritical water from the at least one production well.

8. The system of claim 6, wherein the at least one geothermal energy generator comprises a first turbine and a second turbine, wherein the first turbine comprises a condenser utilizing a coolant, and the second turbine is configured to receive the coolant, to permit the coolant to expand, and to provide power.

9. The system of claim 6, wherein the at least one geothermal energy generator comprises a first turbine and a second turbine, wherein the first turbine uses a first working fluid and the second turbine uses a second fluid, the second fluid having a lower heat of vaporization than water, the second fluid having a lower boiling point than water.

10. The system of claim 1, wherein the at least one geothermal energy generator is configured to be at least partially operated or maintained by a remotely operable submersible vehicle.

11. The system of claim 1, wherein the at least one geothermal energy generator produces direct current electricity.

12. The system of claim 1, wherein the at least one geothermal energy generator comprises one or more electrolyzers configured to use electricity from a land-based source.

13. The system of claim 1, wherein the at least one geothermal energy generator is configured to convert the geothermal heat to electricity, the at least one geothermal energy generator comprising one or more electrolyzers configured to receive at least a portion of the electricity and to convert water into hydrogen and oxygen.

14. The system of claim 13, wherein the one or more electrolyzers are adapted to be submerged.

15. The system of claim 13, wherein the one or more electrolyzers has a standardized form to facilitate maintenance of the one or more electrolyzers.

16. The system of claim 13, wherein the at least one geothermal energy generator comprises one or more heat pumps configured to further increase the temperature of the water converted by the one or more electrolyzers.

17. The system of claim 13, further comprising an energy storage subsystem.

18. The system of claim 17, wherein the energy storage subsystem is configured to store a compressed gas at a depth in the body of water.

19. The system of claim 18, wherein the compressed gas comprises hydrogen generated by the one or more electrolyzers.

20. The system of claim 18, wherein the energy storage subsystem is configured to be operated or maintained by a remotely operable submersible vehicle.

21. The system of claim 18, wherein the compressed gas comprises hydrogen stored in a first volume and oxygen stored in a second volume separate from the first volume.

22. The system of claim 21, wherein said system is configured to be operatively connected to one or more gas transmission lines to transport at least some of the hydrogen, the oxygen, or both the hydrogen and the oxygen to land.

23. The system of claim 21, wherein said system is configured to be operatively connected to one or more gas transmission lines to transport at least some of the hydrogen, the oxygen, or both the hydrogen and the oxygen to one or more platforms floating in the vicinity of the system.

24. The system of claim 1, further comprising high-voltage direct current transmission lines configured to transmit direct electrical current converted from the geothermal heat from the at least one geothermal energy generator to a continental coastline.

25. A method of providing energy, the method comprising:
providing at least one geothermal energy system utilizing geothermal heat under the floor of a body of water, the at least one system comprising:
- at least one production well, where said at least one production well is drilled to a sufficient depth to access supercritical water from a first region of a reservoir under the floor;
- at least one injection well configured to inject water into a second region of the reservoir spaced from the first region; and
- at least one geothermal-powered electrical generating station at a depth of at least 2000 meters within the body of water and operatively coupled to the at least one production well and the at least one injection well, the at least one geothermal-powered electrical generating station configured to receive the supercritical water from the at least one production well, to convert geothermal heat from the supercritical water to electrical energy, and to pump water into the at least one injection well;

operating the at least one system to provide electricity to an electrical power grid, to provide transportation energy, or both.

26. The method of claim 25, wherein the transportation energy is hydrogen.

27. The method of claim 25, wherein providing the at least one geothermal energy system comprises drilling the at least one production well using seawater as a drilling fluid.

28. The method of claim 25, wherein the system further comprises at least one energy storage subsystem, wherein operating the at least one system comprises coordinating the at least one geothermal-powered electrical generating station and the at least one energy storage subsystem to meet current electricity demands and to utilize excess electricity produced to provide inventories of energy for transportation purposes.

* * * * *